United States Patent
Itou et al.

(10) Patent No.: US 10,422,264 B2
(45) Date of Patent: Sep. 24, 2019

(54) WORK MACHINE

(71) Applicant: KCM CORPORATION, Kako-gun, Hyogo (JP)

(72) Inventors: Yoshihiro Itou, Ryuugasaki (JP); Hiroyuki Kizaki, Nagareyama (JP); Takashi Takeyama, Ryuugasaki (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 15/754,299

(22) PCT Filed: Jan. 5, 2017

(86) PCT No.: PCT/JP2017/000181
§ 371 (c)(1),
(2) Date: Feb. 22, 2018

(87) PCT Pub. No.: WO2017/168915
PCT Pub. Date: Oct. 5, 2017

(65) Prior Publication Data
US 2018/0238220 A1 Aug. 23, 2018

(30) Foreign Application Priority Data

Mar. 29, 2016 (JP) .................. 2016-066541

(51) Int. Cl.
*F01N 3/28* (2006.01)
*B01D 53/94* (2006.01)
(Continued)

(52) U.S. Cl.
CPC .......... *F01N 3/2889* (2013.01); *B01D 53/94* (2013.01); *B01D 53/9477* (2013.01);
(Continued)

(58) Field of Classification Search
CPC ...... F01N 3/2889; F01N 3/2066; F01N 13/08; F01N 2240/02; F01N 2590/08;
(Continued)

(56) References Cited

U.S. PATENT DOCUMENTS

2014/0290222 A1* 10/2014 Sawada ............... F01N 3/10
60/286
2014/0360161 A1 12/2014 Arani et al.
2017/0016375 A1* 1/2017 Okada .................. F16L 53/00

FOREIGN PATENT DOCUMENTS

JP 2010-285814 A 12/2010
JP 2014-084832 A 5/2014
(Continued)

OTHER PUBLICATIONS

International Search Report of PCT/JP2017/000181 dated Mar. 14, 2017.

*Primary Examiner* — Audrey K Bradley
*Assistant Examiner* — Kelsey L Stanek
(74) *Attorney, Agent, or Firm* — Mattingly & Malur, PC (57) ABSTRACT

A work machine provided with an exhaust gas purifying device includes a selective catalytic reducing device that performs treatment on exhaust gas of an engine, and a reducing agent injection device that injects a reducing agent into exhaust gas to be supplied to the selective catalytic reducing device. The work machine is provided with a housing that delimits an engine room accommodating the engine and the exhaust gas purifying device. The housing includes a top board that covers the engine room above the engine, and an exhaust duct that is provided in the top board and discharges the air in the engine room to the outside of the engine room. A part of a reducing agent supply pipe for guiding the reducing agent to the reducing agent injection (Continued)

device is disposed in the exhaust duct in a position above the reducing agent injection device.

4 Claims, 10 Drawing Sheets

(51) Int. Cl.
| | |
|---|---|
| *B60K 11/06* | (2006.01) |
| *E02F 9/00* | (2006.01) |
| *F01P 3/20* | (2006.01) |
| *F01N 13/08* | (2010.01) |
| *F01P 7/16* | (2006.01) |
| *E02F 9/08* | (2006.01) |
| *B60K 11/02* | (2006.01) |
| *B60K 13/04* | (2006.01) |
| *F01N 3/20* | (2006.01) |

(52) U.S. Cl.
CPC ............ *B60K 11/02* (2013.01); *B60K 11/06* (2013.01); *B60K 13/04* (2013.01); *E02F 9/00* (2013.01); *E02F 9/0866* (2013.01); *E02F 9/0883* (2013.01); *E02F 9/0891* (2013.01); *F01N 13/08* (2013.01); *F01P 3/20* (2013.01); *F01P 7/16* (2013.01); *B01D 53/944* (2013.01); *B01D 53/9418* (2013.01); *B01D 2251/2067* (2013.01); *B01D 2258/012* (2013.01); *B60Y 2200/411* (2013.01); *B60Y 2200/415* (2013.01); *B60Y 2306/05* (2013.01); *F01N 3/2066* (2013.01); *F01N 2240/02* (2013.01); *F01N 2590/08* (2013.01); *F01N 2610/02* (2013.01); *F01N 2610/14* (2013.01); *Y02A 50/2325* (2018.01)

(58) Field of Classification Search
CPC . F01N 2610/02; F01N 2610/14; B01D 53/94; B01D 53/9477; B60K 11/06; E02F 9/00; E02F 9/0866; E02F 9/0883; E02F 9/0891; F01P 3/20; F01P 7/16; Y02A 50/2325; B60Y 2200/411; B60Y 2306/05
USPC .......................................................... 60/274
See application file for complete search history.

(56) References Cited

FOREIGN PATENT DOCUMENTS

| | | |
|---|---|---|
| JP | 2014-181718 A | 9/2014 |
| JP | 5603517 B2 | 10/2014 |
| JP | 2015-197079 A | 11/2015 |
| JP | 2015-229996 A | 12/2015 |

* cited by examiner

WORK MACHINE

TECHNICAL FIELD

The present invention relates to a work machine.

BACKGROUND ART

There is known a work machine including an exhaust gas purifying device that removes a nitrogen oxide (NOx) being discharged (cf. Patent Literature 1). Patent Literature 1 describes an exhaust gas after-treatment unit including: a selective catalytic reducing device; a reducing agent injection device that injects a reducing agent, such as a urea aqueous solution, into exhaust gas to be supplied to the selective catalytic reducing device; a cooling water supply pipe that guides cooling water to the injection device; and a cooling water return pipe for discharging the cooling water from the injection device.

The cooling water supply pipe and the cooling water return pipe each include a convection portion extending upward from a portion connected with the injection device along a connection pipe that guides the exhaust gas from the engine to the selective catalytic reducing device. In the technique described in Patent Literature 1, the convection portion is provided in each of the cooling water supply pipe and the cooling water return pipe, and after stopping of the engine, cooling water having increased in temperature due to absorption of heat from the injection device is convected in the convection portion to enable cooling of the injection device.

CITATION LIST

Patent Literature

Patent Literature 1: Japanese Patent No. 5603517

SUMMARY OF INVENTION

Technical Problem

A reducing agent supply pipe for guiding the reducing agent to the reducing agent injection device is connected to the exhaust gas purifying device. When the temperature of the reducing agent in the reducing agent supply pipe increases due to an influence of heat from a heating element such as the engine, the quality of the reducing agent may deteriorate.

Solution to Problem

A work machine according to one aspect of the present invention is a work machine provided with an exhaust gas purifying device including a selective catalytic reducing device that performs treatment on exhaust gas of an engine, and a reducing agent injection device that injects a reducing agent into exhaust gas to be supplied to the selective catalytic reducing device. The work machine is provided with a housing that delimits an engine room accommodating the engine and the exhaust gas purifying device. The housing includes a top board that covers the engine room above the engine, and an exhaust duct that is provided in the top board and discharges the air in the engine room to the outside of the engine room. A part of a reducing agent supply pipe for guiding the reducing agent to the reducing agent injection device is disposed in the exhaust duct in a position above the reducing agent injection device.

Advantageous Effect of Invention

According to the present invention, it is possible to prevent an increase in temperature of a reducing agent in a reducing agent supply pipe.

DESCRIPTION OF EMBODIMENT

In the following, one embodiment of a work machine (work vehicle) according to the present invention will be described with reference to the drawings. For convenience of description, in the present embodiment, front-rear directions, right-left directions, and up-down directions are defined as put down in each of the drawings. Further in the present embodiment, of members constituting the work machine, description of some or all of members which need to be omitted for description are omitted in each of the drawings.

Figure 1:
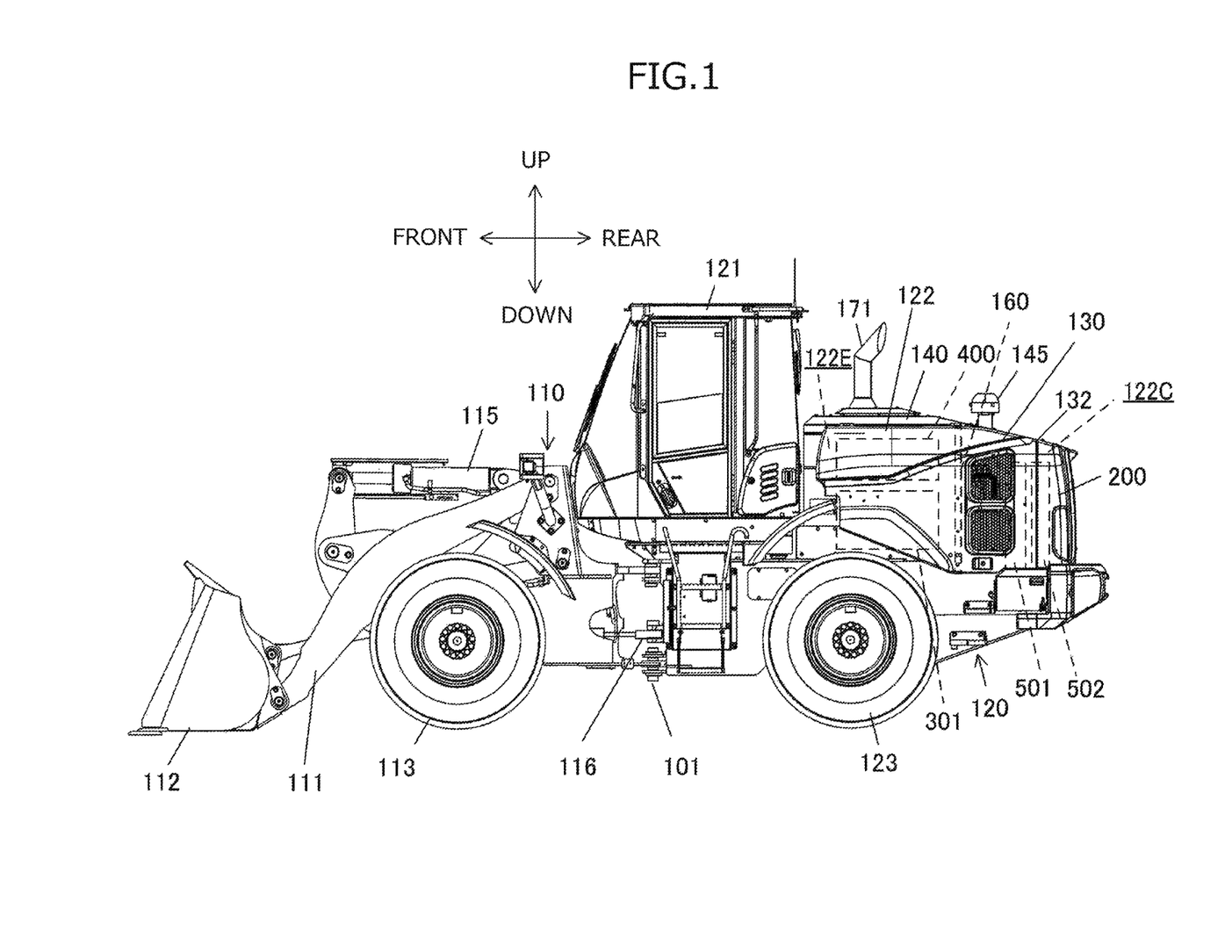
FIG. 1 is a side view of a wheel loader.

FIG. 1 is a side view of a wheel loader which is one example of a work machine according to one embodiment of the present invention. As shown in FIG. 1, the wheel loader is made up of a front vehicle body 110 including an arm 111, a bucket 112, front wheels 113, and the like, and a rear vehicle body 120 including an operator's cab 121, a housing 122, rear wheels 123, and the like.

The arm 111 vertically rotates (moves up and down) by drive of an arm cylinder (not shown), and the bucket 112 vertically rotates (crowds and dumps) by drive of the bucket cylinder 115. The front vehicle body 110 and the rear vehicle body 120 are rotatably coupled to each other with a center pin 101, and the front vehicle body 110 horizontally bent with respect to the rear vehicle body 120 by shrinkage of the steering cylinder 116.

The housing 122 constitutes an outline of a storage chamber accommodating an engine 301, an exhaust gas purifying device 400, a heat exchanger, a variety of hydraulic equipment, and the like. Openings on the right and left side surfaces of the housing 122 are covered by a pair of right and left operable/closable housing covers 130. The housing cover 130 is an opening/closing cover of a gull wing type, and configured to be opened substantially horizontally to the ground, with a rotation fulcrum (hinge) provided between the top board of the housing 122 and the housing cover 130. The housing covers 130 respectively provided on the right and left side surfaces of the wheel loader 100 have substantially a bilaterally symmetrical shape.

Figure 2:
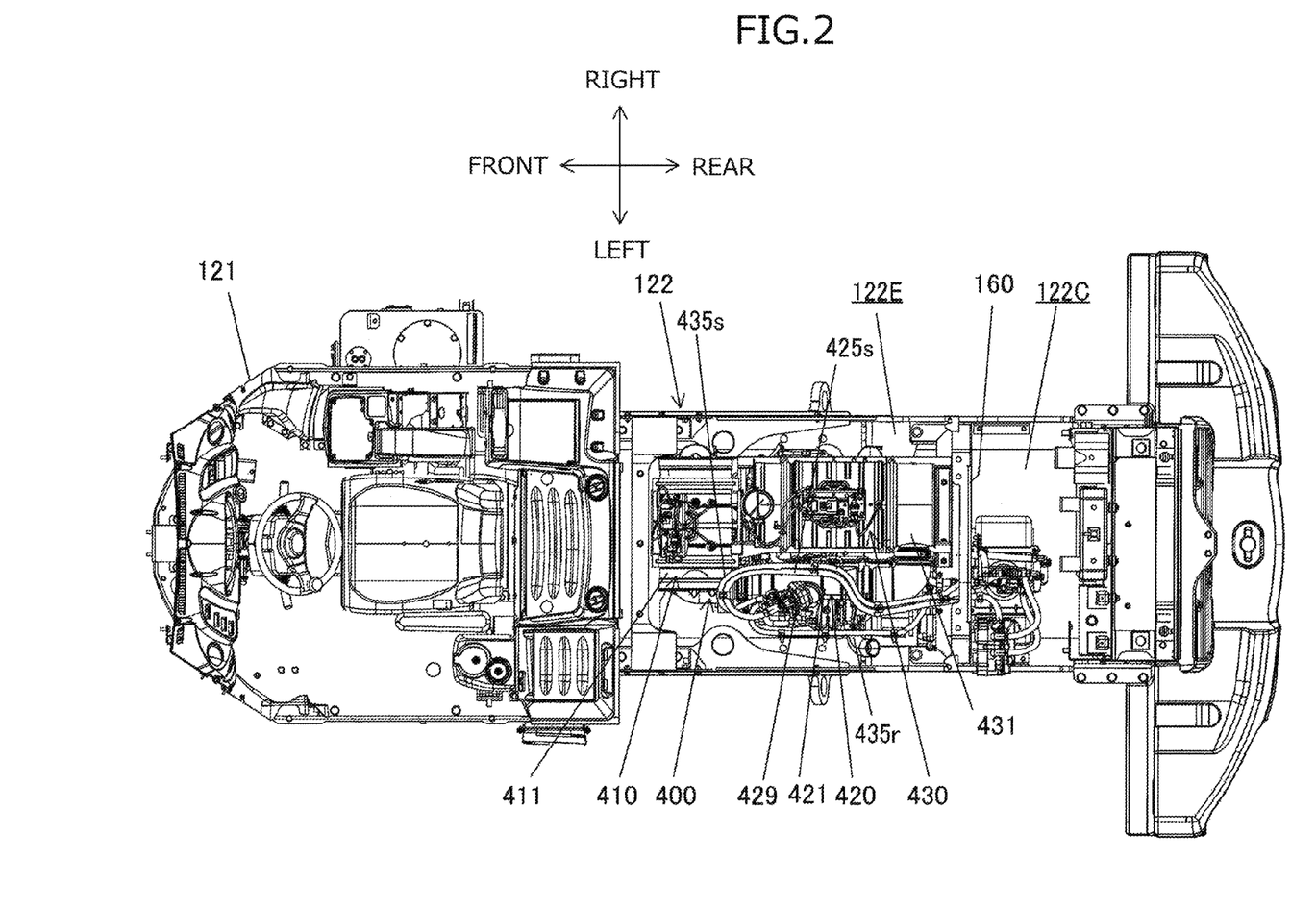
FIG. 2 is a plan view of the wheel loader in a state where an upper structure such as a top board has been removed.

FIG. 2 is a plan view of the wheel loader in a state where the upper structure such as the top board has been removed. As shown in FIG. 2, the storage chamber (storage space) provided inside the housing 122 is divided by a partition 160 into an engine room 122E on the front side of the vehicle and a cooler chamber 122C on the rear side of the vehicle.

As shown in FIG. 1, the side surface of the engine room 122E is covered by a part of the housing cover 130, and the upper surface of the engine room 122E is covered by an engine hood 140 constituting the top board of the housing 122. The front surface of the engine room 122E is covered by a front plate 811 of a front-side frame 810 (cf. FIG. 4), and the rear surface of the engine room 122E is covered by the partition 160 of a rear-side frame 161 (cf. FIG. 3). That is, the engine room 122E is delimited by the part of the pair of right and left housing covers 130, the engine hood 140, the front plate 811 (cf. FIG. 4), and the partition 160 (cf. FIG. 3).

The side surface of the cooler chamber 122C is covered by a part of the housing cover 130, and the upper surface of the cooler chamber 122C is covered by a housing cover 132 for cooler which constitutes the top board of the housing 122. The front surface of the cooler chamber 122C is covered by the partition 160, and the rear surface of the cooler chamber 122C is covered by a grille 200. That is, the cooler chamber 122C is delimited by the part of the pair of right and left housing cover 130, the housing cover 132 for cooler, the partition 160, and the grille 200.

A heat exchanger 501 and a cooling fan unit 502 are disposed inside the cooler chamber 122C. The heat exchanger 501 includes: a plurality of heat exchangers such as a radiator 504 (cf. FIG. 9) that cools the cooling water of the engine 301, an oil cooler that cools a hydraulic oil, and an inter cooler that cools the air pressurized by a supercharger of the engine 301; and a radiator frame for supporting these heat exchangers. The cooling fan unit 502 includes a cooling fan 503 (cf. FIG. 9) for generating cooling wind for cooling the heat exchanger 501 and a shroud for supporting the cooling fan 503 (cf. FIG. 9). In accordance with the model of the wheel loader, heat exchangers, such as a transmission oil cooler and a capacitor of an air conditioner for air conditioning in the operator's cab 121, are also fitted in the heat exchanger 501.

Figure 3:
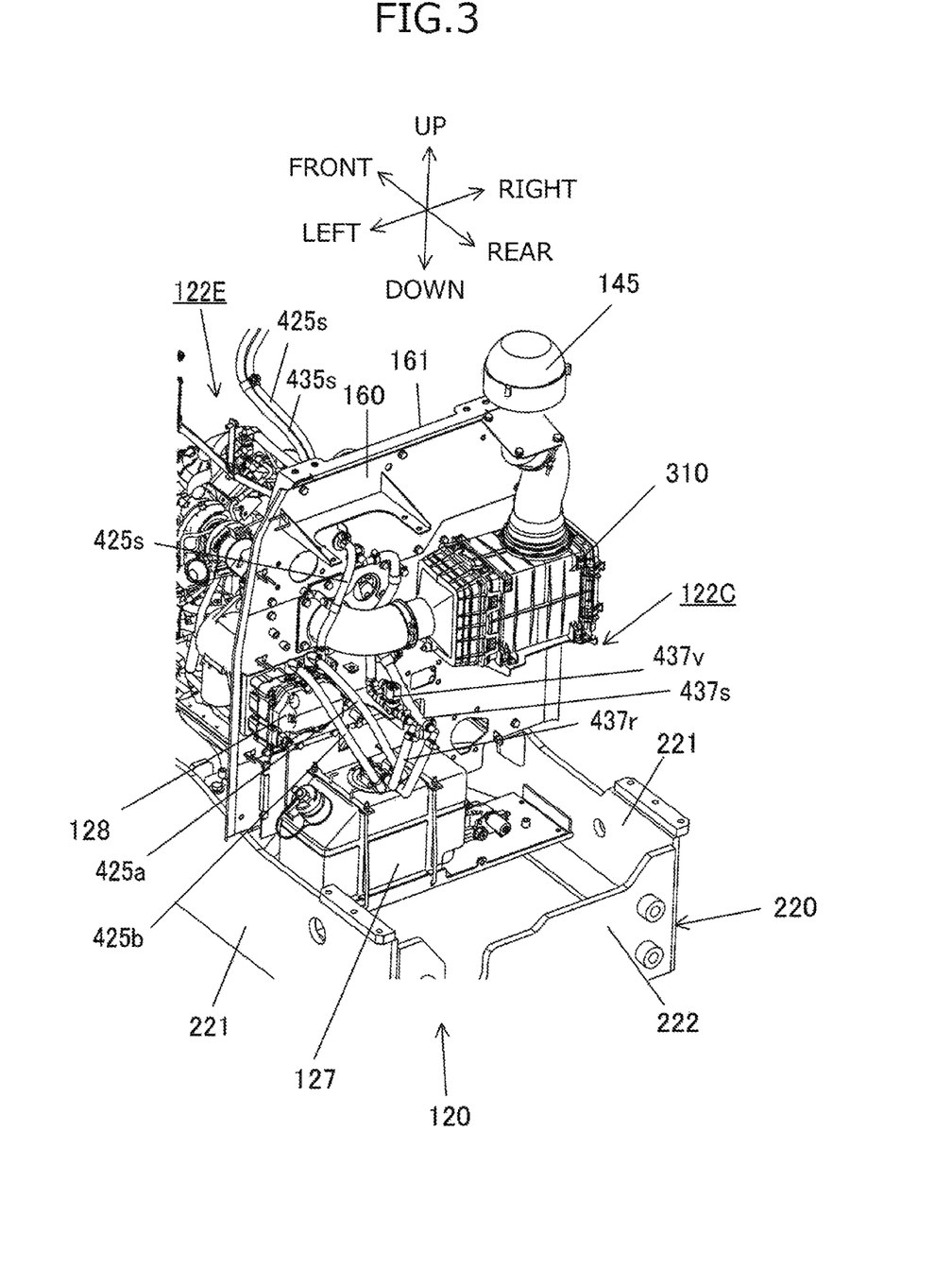
FIG. 3 is a perspective view showing the inside of a cooler chamber.

As shown in FIG. 1, an intake pipe 145 protrudes from the upper surface of the housing cover 132 for cooler, the intake pipe 145 being configured to take air necessary for the drive of the engine 301 via an air cleaner 310 (cf. FIG. 3). As shown in FIG. 3, the air cleaner 310 is provided immediately behind the partition 160 in the cooler chamber 122C. The air cleaner 310 is connected to the engine 301 via the suction pipe. Providing the air cleaner 310 in the cooler chamber 122C can reduce an influence of heat from the engine 301 or the exhaust gas purifying device 400 to the air cleaner 310. It is thereby possible to prevent an increase in temperature of air to be sucked by the engine 301 and prevent deterioration in suction efficiency of the engine 301.

As shown in FIG. 1, the exhaust gas purifying device 400 for purifying the exhaust gas of the engine 301 is set up above the engine 301 in the engine room 122E. A tale pipe 171 for discharging the exhaust gas protrudes from the engine hood 140.

Figure 4:
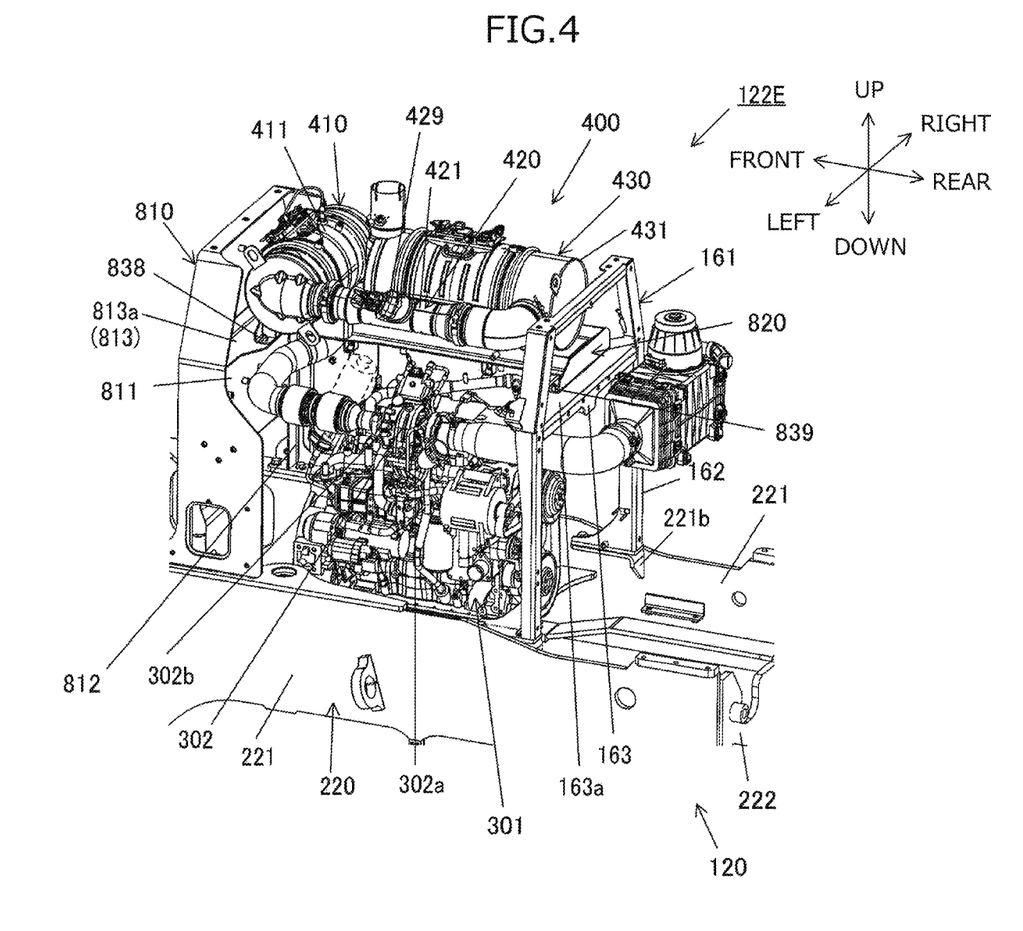
FIG. 4 is a perspective view showing the inside of an engine room.

FIG. 3 is a perspective view showing the inside of the cooler chamber 122C, and FIG. 4 is a perspective view showing the inside of the engine room 122E. In FIGS. 3 and 4, the housing cover 130, the engine hood 140, the housing cover 132 for cooler, the grille 200, and the like which constitute the housing 122 are omitted.

As shown in FIG. 4, the engine 301 is fitted in a mounting bracket, not shown, in the rear vehicle body 120 in the engine room 122E. The supercharger (turbocharger) 302 is fitted in the engine 301. The supercharger 302 is set up such that a suction port of a compressor 302a is directed rearward and an exhaust port of a turbine 302b is directed forward.

As shown in FIGS. 2 and 4, the exhaust gas purifying device 400 includes an oxidation catalyst device (DOC: Diesel Oxidation Catalyst) 410, a reducing agent injection device (DRT: Decomposition Reactor Tube) 420, and a selective catalytic reducing device (SCR: Selective Catalytic Reduction) 430, which are installed in an exhaust passage of the engine 301. The oxidation catalyst device 410, the reducing agent injection device 420, and the selective catalytic reducing device 430 are disposed in this order from the upstream along the flow of the exhaust gas. Each of the after-treatment devices (410, 420, 430) is connected by a connection pipe such as an elbow.

The oxidation catalyst device 410 includes: an oxidation catalyst for oxidizing and removes nitric monoxide (NO), carbon monoxide (CO), hydrocarbon (HC), and the like contained in the exhaust gas; and a cylindrical DOC casing 411 for holding the oxidation catalyst. The reducing agent injection device 420 is installed downstream of the oxidation catalyst device 410.

The reducing agent injection device 420 includes an injection valve 429 for injection a urea aqueous solution (hereinafter referred to as urea water) being a reducing agent into the exhaust gas to be supplied to the selective catalytic reducing device 430, and a cylindrical DRT housing 421 for holding the injection valve 429. The injection valve 429 is provided substantially at the center of the DRT housing 421. The injection valve 429 injects urea water into the DRT housing 421 in accordance with a control signal from a control device, not shown. The injection valve 429 is opened or closed by allowing a current to flow in a coil to generate a magnetic field in a magnetic circuit including a mover and a core and cause action of magnetic suction force that attracts the mover to the core, and the injection valve 429 has a similar configuration to that of a known electromagnetic driving fuel injection valve (injector). The selective catalytic reducing device 430 is installed downstream of the reducing agent injection device 420.

The selective catalytic reducing device 430 includes a reduction catalyst for performing reduction purification treatment on a nitrogen oxide (NOx) contained in the exhaust gas by using urea water as the reducing agent, and a cylindrical SCR housing 431 for holding the reduction catalyst. In the selective catalytic reducing device 430, the oxidation catalyst is provided downstream of the reduction catalyst.

As shown in FIG. 3, the injection valve 429 is connected to a urea water tank 127 via pipes (a suction pipe 425a and a reducing agent supply pipe 425s). The urea water tank 127 is a container for storing the urea water as the reducing agent. A urea water pump 128 is provided between the injection valve 429 in the engine room 122E and the urea water tank 127 in the cooler chamber 122C. The urea water pump 128 is fixed to the partition 160 inside the cooler chamber 122C. The urea water pump 128 is an electric pump for sucking the urea water in the urea water tank 127 to convey the urea water to the injection valve 429.

The injection valve 429 shown in FIG. 4 injects into the exhaust passage the urea water supplied from the urea water tank 127 by the urea water pump 128. When the urea water is injected, ammonia is generated from the urea water by using the reduction catalyst of the selective catalytic reducing device 430, and ammonia causes a reduction reaction of NOx in the exhaust gas, to be decomposed into water and nitrogen. Ammonia in the exhaust gas is reduced by the oxidation catalyst provided downstream of the reduction catalyst in the selective catalytic reducing device 430.

As shown in FIGS. 3 and 4, a rear frame 220 constituting the rear vehicle body 120 is formed in the shape of a rectangular frame, made up of a pair of right and left longitudinal plates 221 and a lateral plate 222 having the front end and the rear end respectively coupled to the pair of right and left longitudinal plates 221 (the lateral plate at the front end is not shown).

As shown in FIG. 4, the exhaust gas purifying device 400 is supported by the front-side frame 810 and the rear-side frame 161 via a base bracket 820 being a support structure. The rear-side frame 161 is fixed to the longitudinal plate 221 via a bracket 221b that is welded inside each of the pair of right and left longitudinal plates 221 constituting the rear frame 220. The rear side frame 161 is a gate-shaped support member, and a pair of right and left leg portions 162 is respectively fitted on the pair of right and left longitudinal plates 221. A horizontally and vertically extending support beam 163 is firmly fixed to the pair of right and left leg portions 162. A protruding reception portion 163a protruding forward is provided in the support beam 163. As shown in FIG. 3, the tabular partition 160 described above is fitted on the rear surface of the rear-side frame 161 by using a fastening member such as a bolt or a nut.

As shown in FIG. 4, the front-side frame 810 has a similar configuration to that of the rear-side frame 161. The front-side frame 810 is fixed to the pair of right and left longitudinal plates 221 constituting the rear frame 220. The front-side frame 810 is a gate-shaped support member, and a pair of right and left leg portions 812 is respectively fitted on the pair of right and left longitudinal plates 221. A horizontally and vertically extending support beam 813 is firmly fixed to the pair of right and left leg portions 812. A protruding reception portion 813a protruding rearward is provided in the support beam 813. The tabular front plate 811 is fitted on the front surface of the front-side frame 810 by using fastening members such as a bolt and a nut.

A front leg 838 of the base bracket 820 is mounted in the protruding reception portion 813a of the front-side frame 810, and a rear leg 839 of the base bracket 820 is mounted in the protruding reception portion 163a of the rear-side frame 161. When the front leg 838 is fixed to the protruding reception portion 813a by using a bolt and a nut and the rear leg 839 is fixed to the protruding reception portion 163a by using a bolt and a nut, the base bracket 820 is fixed to and supported by the front-side frame 810 and the rear-side frame 161.

As thus described, by the fixation of the exhaust gas purifying device 400 to the base bracket 820 and the fixation of the base bracket 820 to the front-side frame 810 and the rear-side frame 161, the exhaust gas purifying device 400 is disposed and fixed in a predetermined position above the engine 301.

Figure 5:
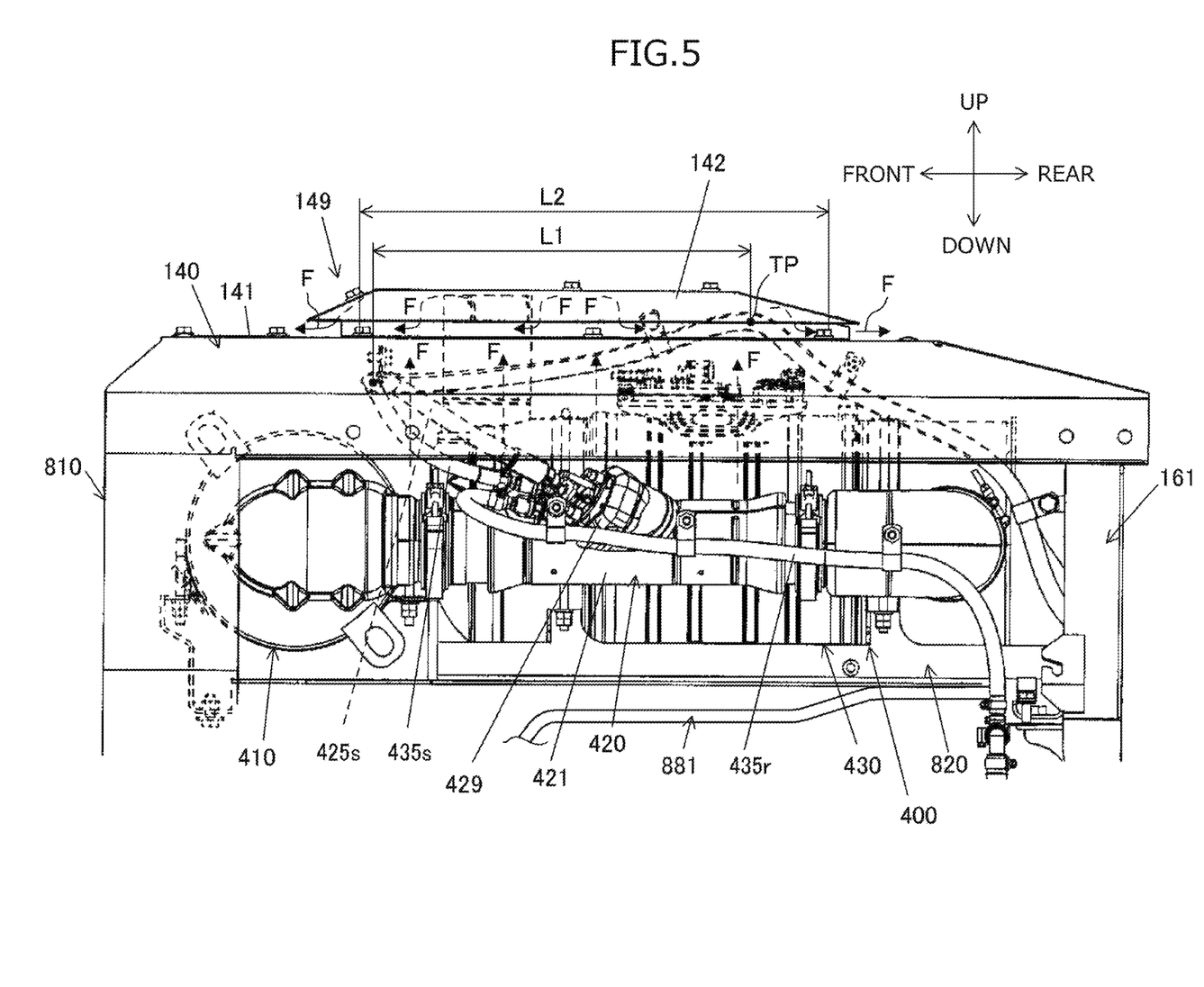
FIG. 5 is a view of the engine room seen from the left side.

FIG. 5 is a view of the engine room 122E seen from the left side. In FIG. 5, the housing cover 130 is omitted. As shown in FIG. 5, the engine hood 140 covering the engine room 122E is provided above the engine 301 and the exhaust gas purifying device 400. The front end of the engine hood 140 is fitted on the upper end of the front-side frame 810, and the rear end of the engine hood 140 is fitted on the upper end of the rear-side frame 161. That is, the front-side frame 810 and the rear-side frame 161 are support structures for supporting the engine hood 140 covering the engine room 122E thereabove.

Figure 6:
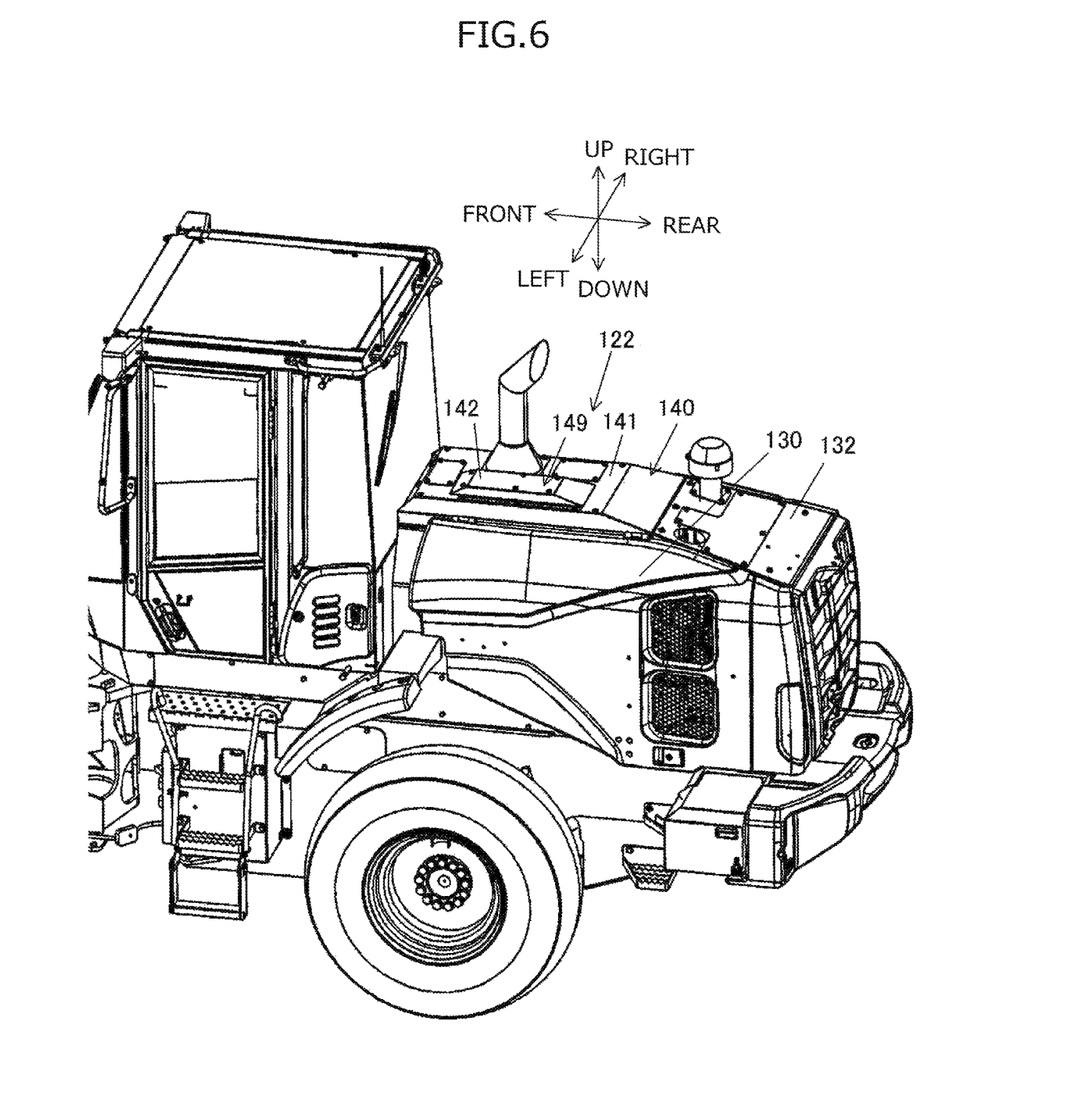
FIG. 6 is a perspective view of a housing seen from left obliquely above.
Figure 7A:
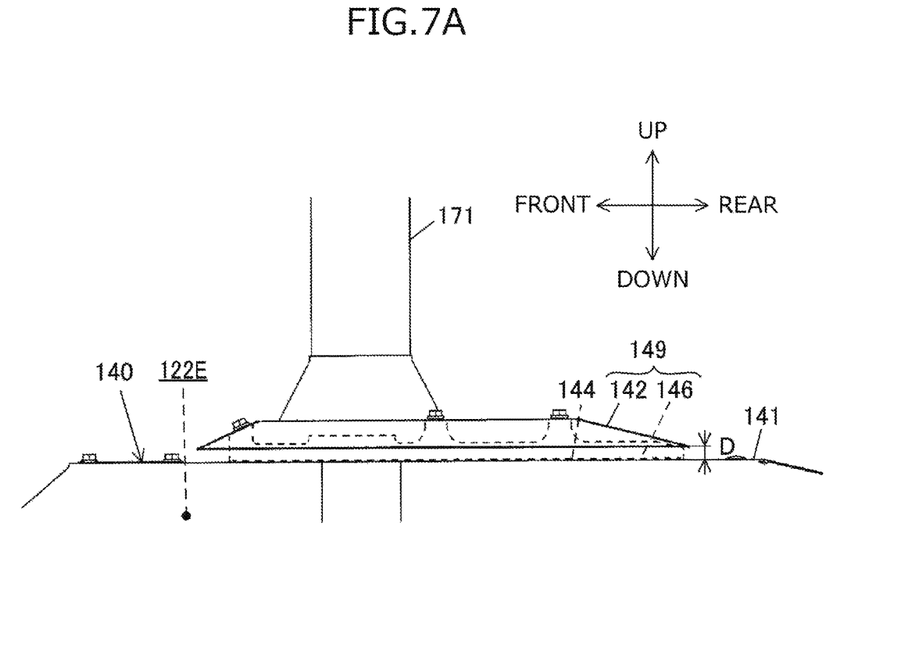
FIG. 7A is a side schematic view of an exhaust duct.
Figure 7B:
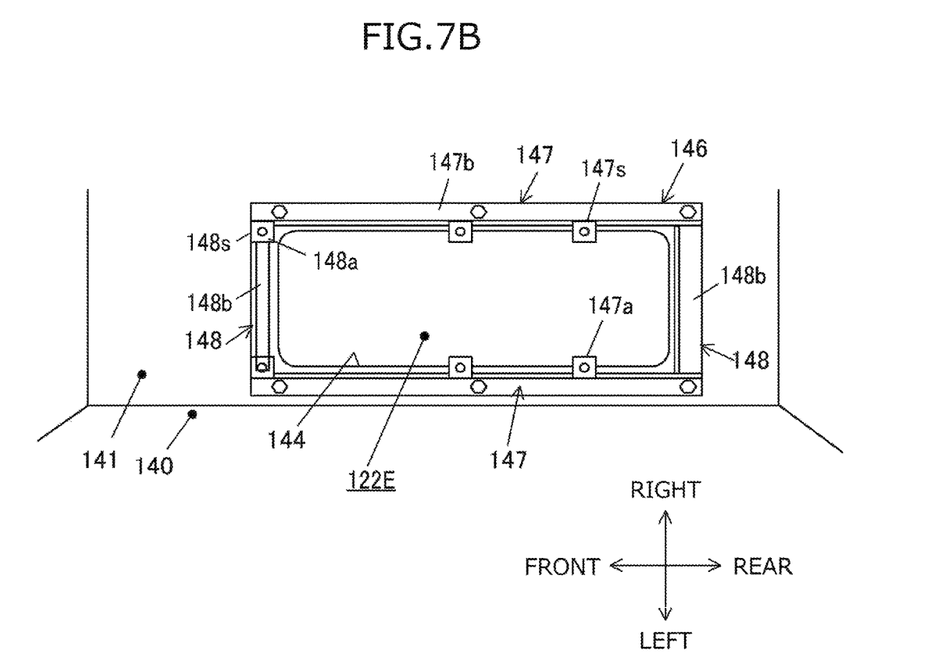
FIG. 7B is a plan schematic view of the exhaust duct.
Figure 8:
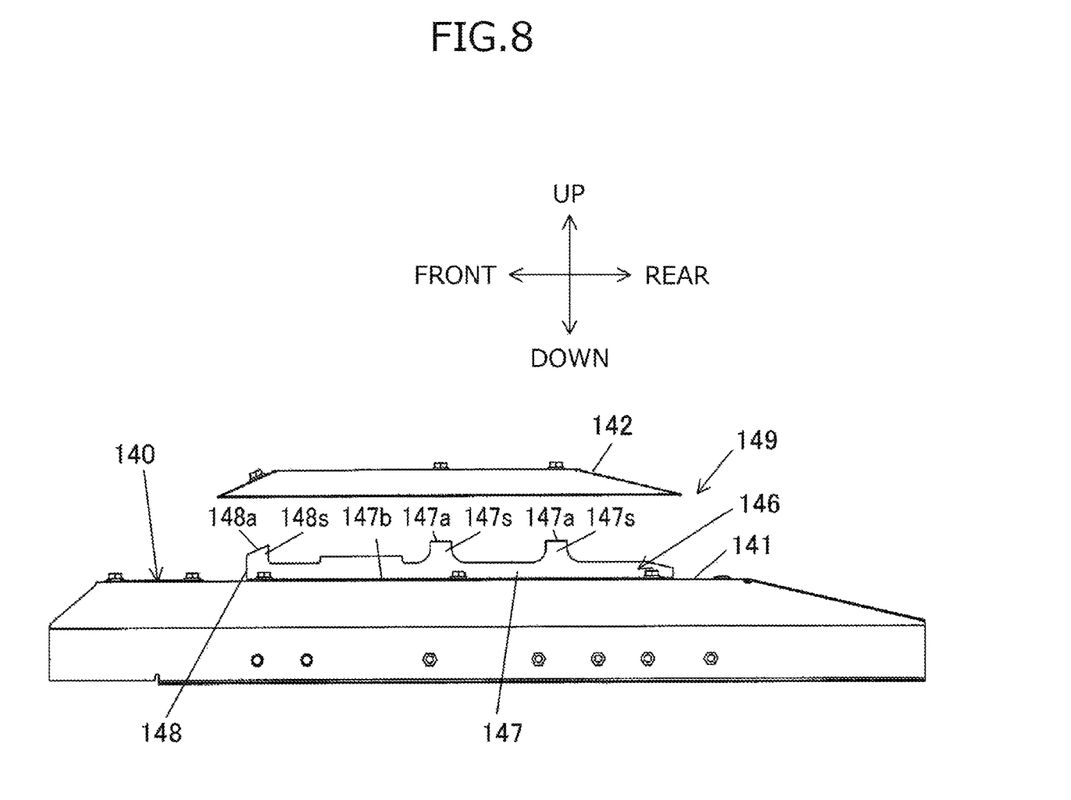
FIG. 8 is a side schematic view of the exhaust duct in a disassembled state.

FIG. 6 is a perspective view of the housing 122 seen from left obliquely above. As shown in FIG. 6, an exhaust duct 149 is provided in a tabular ceiling board 141 of the engine hood 140. FIG. 7A is a side schematic view of the exhaust duct 149, and FIG. 7B is a plan schematic view of the exhaust duct 149. In FIG. 7B, an opening cover 142 is omitted. FIG. 8 is a side schematic view of the exhaust duct 149 in a disassembled state. The exhaust duct 149 is an exhaust passage forming element for forming an exhaust passage that discharges the air inside the engine room 122E to the outside of the engine room 122E, and protrudes upward from the ceiling board 141.

As shown in FIGS. 7A and 8, the exhaust duct 149 has a cover support frame 146 fitted on an opening 144 in the ceiling board 141 and has the opening cover 142. The opening cover 142 is obtained by processing a tabular member to be formed into a bottom-open quadrangular prismatic trapezoidal shape.

As shown in FIG. 7B, a rectangular opening 144 is provided in the ceiling board 141 constituting the engine hood 140, the opening 144 having a pair of longer sides along the longitudinal direction and a pair of shorter sides along the horizontal direction. The opening 144 is provided immediately above the reducing agent injection device 420. The cover support frame 146 in the shape of a rectangular frame, a size larger than the opening 144, is provided around the opening 144.

As shown in FIGS. 7A, 7B, and 8, the cover support frame 146 is the support structure for supporting the opening cover 142, and includes a pair of right and left longitudinal frames 147 extending longitudinally and a pair of front and rear lateral frames 148 extending horizontally. The longitudinal frame 147 and the lateral frame 148 are formed by an angle (angle steel) having an L-shape in cross section, a bent steel member, or the like. The longitudinal frame 147 and the lateral frame 148 have base portions 147b, 148b fixed to the periphery of the opening 144, and a plurality of support portions 147s, 148s rising from base portions 147b, 148b. Fitting pieces 147a, 148a are provided at the tips of the plurality of support portions 147s, 148s.

The opening cover 142 is fixed to the fitting pieces 147a, 148a of the support portions 147s, 148s by the bolt and the nut. The opening cover 142 has a larger area than that of the opening 144 and covers the entire opening 144 from above. As shown in FIG. 7A, a clearance D is formed between the lower end of the outer periphery of the opening cover 142 and the upper surface of the ceiling board 141.

In FIG. 5, as schematically shown by arrows F, the air in the engine room 122E is warmed by the heating elements such as the engine 301 and the exhaust gas purifying device 400 and rises, to be introduced into the exhaust duct 149. The air introduced into the exhaust duct 149 passes upward through the inside of the rectangular cover support frame 146 and flows longitudinally and horizontally along the opening cover 142. The air passes through the clearance between the support portions in the cover support frame 146 and discharged to the outside from the clearance D between the cover support frame 146 and the ceiling board 141.

Figure 9:
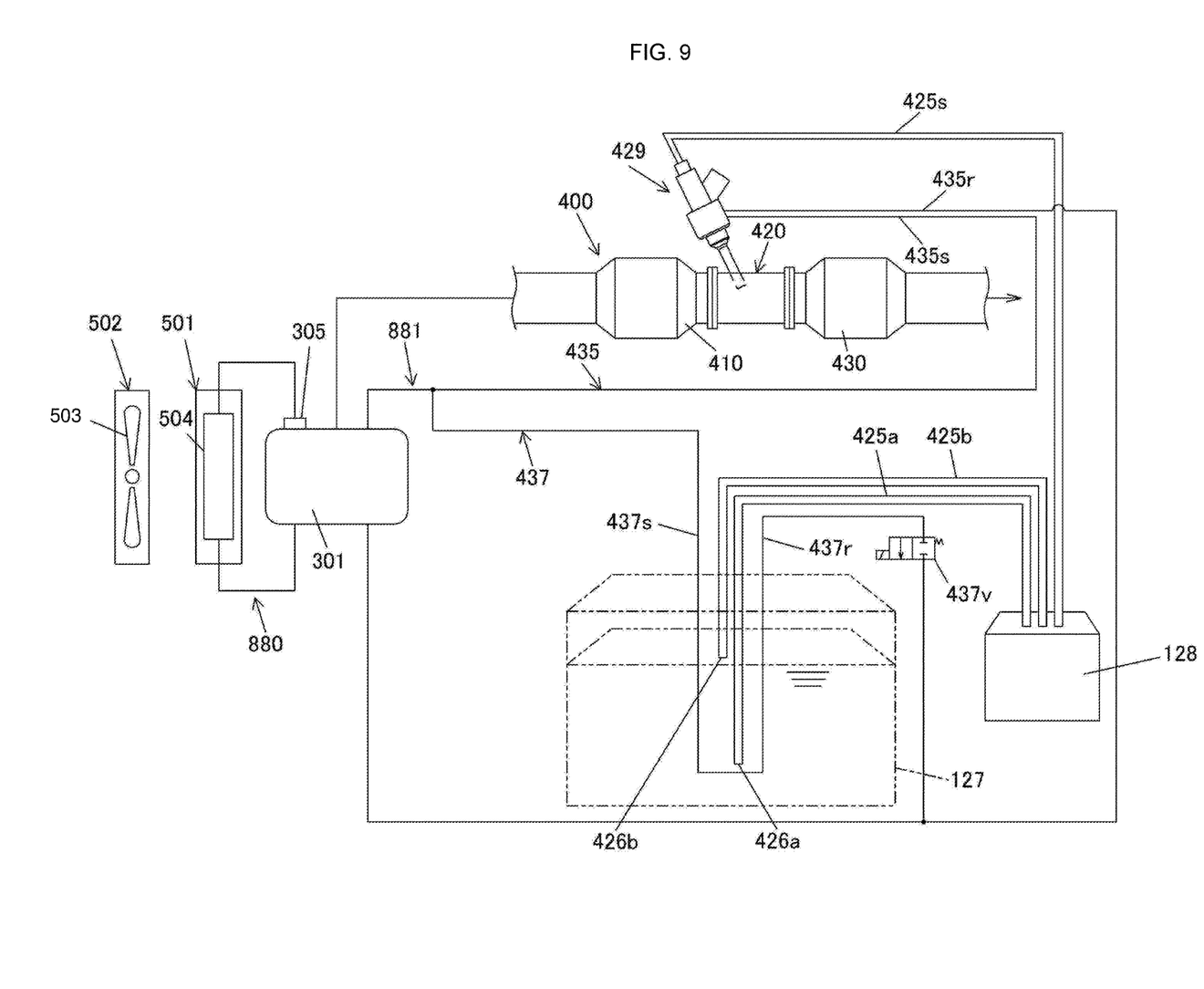
FIG. 9 is a view for describing a urea water supply system and a cooling water circulation system of the exhaust gas purifying device.

With reference to FIG. 9, a description will be given of a urea water supply system and a cooling water circulation system of the exhaust gas purifying device 400. FIG. 9 is a view for describing the urea water supply system and the cooling water circulation system of the exhaust gas purifying device 400. The urea water supply system is made up of the urea water pump 128, the urea water tank 127, and pipes. The urea water pump 128 and the urea water tank 127 are connected by the suction pipe 425*a* and a return pipe 425*b*. The urea water pump 128 and the injection valve 429 are connected by the reducing agent supply pipe 425*s*. A urea water suction port 426*a* is disposed in the vicinity of the bottom of the urea water tank 127 in the suction pipe 425*a*, and a urea water discharge port 426*b* is disposed in the vicinity of the top of the urea water tank 127 in the return pipe 425*b*. Urea water sucked from the bottom of the urea water tank 127 by the urea water pump 128 is supplied into the reducing agent supply pipe 425*s* and pressurized. The urea water in the reducing agent supply pipe 425*s* is injected and supplied to the exhaust passage of the engine 301 by opening of the injection valve 429. An excess of the urea water is returned to the urea water tank 127 via the return pipe 425*b*.

The exhaust gas purifying device 400 includes the cooling water circulation system in order to prevent deterioration in quality of urea water due to an increase in temperature of the urea water. The cooling water circulation system is a system made up of a cooling water pump, not shown, a pipe, and valves, and guiding cooling water (engine cooling water) to the urea water tank 127 and the injection valve 429 to cause the cooling water and the urea water exchange heat. The cooling water circulation system includes an engine cooling system 880, and a refrigerant pipe 881 for guiding the cooling water from the engine cooling system 880 to the urea water tank 127 and the injection valve 429.

The engine cooling system 880 cools the engine 301 by supplying the engine 301 with the cooling water cooled by the radiator 504. The engine 301 is provided with a thermostat 305 and a cooling water pump (not shown) for circulating the engine cooling water. The thermostat 305 opens or closes a route of the engine cooling system 880 between a fully closed state and a fully opened state in accordance with the temperature of the engine cooling water.

Although not shown, in the engine, a bypass route that bypasses the engine cooling water so as not to supply the engine cooling water to the radiator 504 is provided when the thermostat 305 fully closes the route. When the temperature of the engine cooling water is low at the start of the engine, the engine cooling water circulates in the engine and is warmed due to heat generation of the engine 301.

The refrigerant pipe 881 through which the cooling water flows has a first refrigerant pipe 435 that is set up so as to pass through the injection valve 429 and a second refrigerant pipe 437 that is set up so as to pass of the urea water tank 127. The first refrigerant pipe 435 has a first supply pipe 435*s* for guiding the cooling water to the injection valve 429 and a first return pipe 435*r* for returning the engine cooling water from the injection valve 429 to the engine 301. The second refrigerant pipe 437 has a second supply pipe 437*s* for guiding the cooling water to the urea water tank 127 and a second return pipe 437*r* for returning the cooling water from the urea water tank 127 to the engine 301. The second refrigerant pipe 437 is provided with a switching valve 437*v* that is switched between the fully closed state and the fully opened state in accordance with a control signal from the control device, not shown.

With reference to FIG. 3, the pipes around the urea water tank will be described. As shown in FIG. 3, each of the suction pipe 425*a* and the return pipe 425*b* is inserted from the upper surface of the urea water tank 127 into the urea water tank 127. The suction pipe 425*a* and the return pipe 425*b* are connected by the urea water pump 128 fitted on the partition 160. The reducing agent supply pipe 425*s*, through which the urea water discharged from the urea water pump 128 flows, is guided to the engine room 122E via the opening in the partition 160 and connected to the injection valve 429 (cf. FIG. 5).

The second supply pipe 437*s* constituting the second refrigerant pipe 437 is guided from the engine room 122E to the cooler chamber 122C via the opening in the partition 160, to be inserted from the upper surface of the urea water tank 127 into the urea water tank 127. The second return pipe 437*r* constituting the second refrigerant pipe 437 is guided from the upper surface of the urea water tank 127 to the outside of the urea water tank 127 and further guide to the engine room 122E via the opening in the partition 160, to be connected to the engine 301. That is, the second refrigerant pipe 437 through which the engine cooling water flows is set up so as to pass through the urea water tank 127.

With reference to FIG. 5, the pipes around the reducing agent injection device will be described. As shown in FIG. 5, the refrigerant pipe 881 is guided from the engine 301 to the partition 160 along the base bracket 820 and branched into the first refrigerant pipe 435 and the second refrigerant pipe 437. The second refrigerant pipe 437 is guided to the cooler chamber 122C via the opening in the partition 160.

The first supply pipe 435*s* constituting the first refrigerant pipe 435 is guided upward along the partition 160 and further guided front obliquely upward to the rear portion of the exhaust duct 149. The first supply pipe 435*s* is bent in the exhaust duct 149 and guided front obliquely downward to the front portion of the exhaust duct 149. The first supply pipe 435*s* is turned back below the front portion of the exhaust duct 149 and guided rear obliquely downward to the injection valve 429, to be connected to the injection valve 429.

The first return pipe 435*r* constituting the first refrigerant pipe 435 is guided front obliquely upward from the injection valve 429 and turned back in the vicinity of the injection valve 429, and is then guided rear obliquely downward along the DRT housing 421. The first return pipe 435*r* is bent downward in the vicinity of the partition 160 and connected to the engine 301.

The reducing agent supply pipe 425*s* is guided from the opening in the partition 160 to the engine room 122E and routed in the state of being brought close to or into contact with the first supply pipe 435*s* by a similar route to that of the first supply pipe 435*s*. By routing the reducing agent supply pipe 425*s* and the first supply pipe 435*s* in the state of being brought close to or into contact with each other, the temperature of the urea water can be held appropriate through the heat exchange between the urea water and the cooling water in the reducing agent supply pipe 425*s*.

The reducing agent supply pipe 425*s* is guided front obliquely upward to the rear portion of the exhaust duct 149 along with the first supply pipe 435*s*. The reducing agent supply pipe 425*s* is bent in the exhaust duct 149 and guided front obliquely downward to the front portion of the exhaust duct 149. The reducing agent supply pipe 425*s* is turned back below the front portion of the exhaust duct 149 and guided rear obliquely downward to the injection valve 429, to be connected to the injection valve 429.

Meanwhile, the cooling water pump (not shown) for circulating the cooling water is driven by the engine 301. Therefore, when the engine 301 stops, the cooling water pump also stops and the circulation of the cooling water thus stops. However, radiation heat is radiated from the engine 301 even after the engine has stopped, and hence the injection valve 429 needs to be cooled even after the engine has stopped.

The present embodiment is configured such that the first supply pipe 435s connected to the injection valve 429 is provided above the injection valve 429 and the cooling water remains (is reserved) in the pipe even after stopping of the engine.

Figure 10:
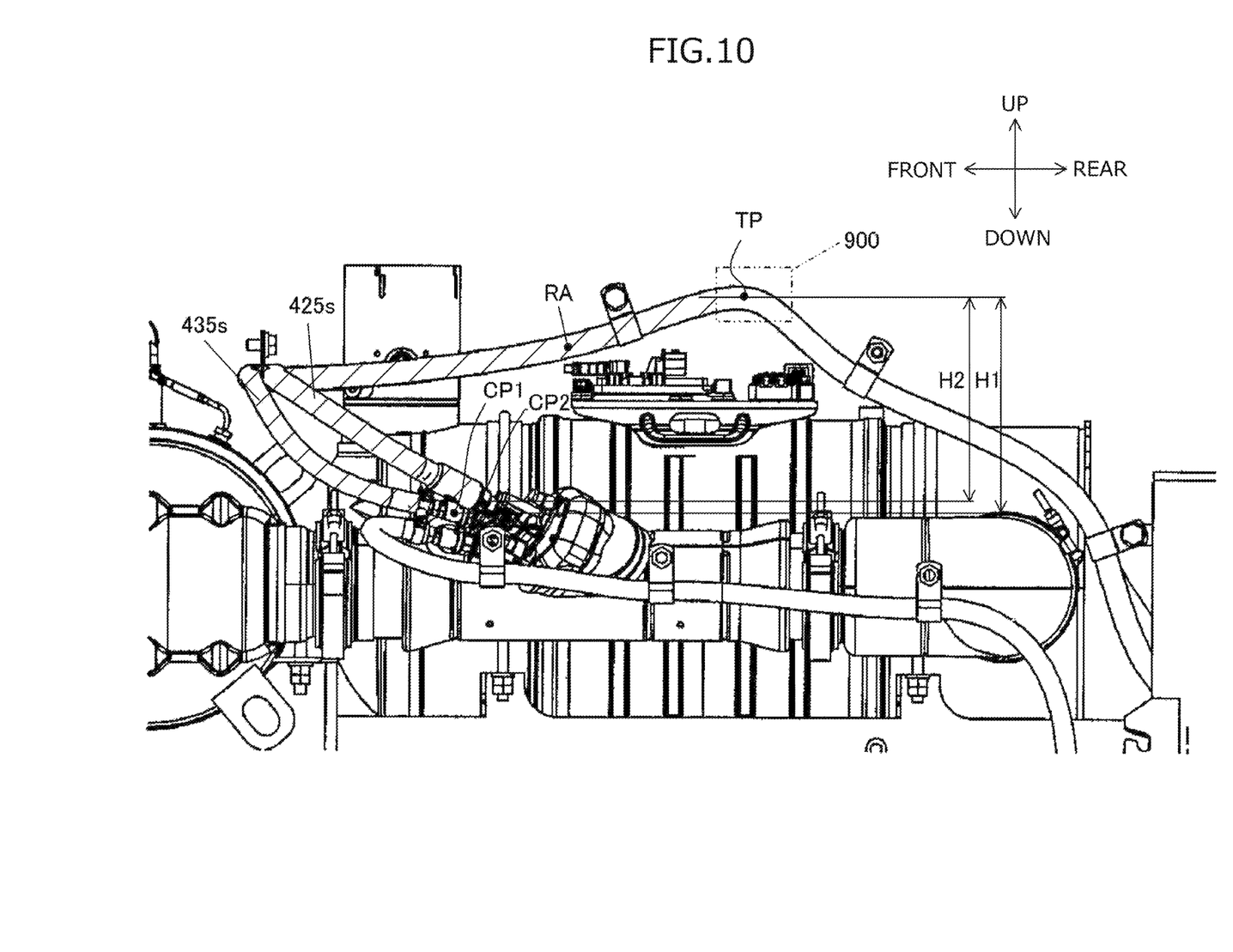
FIG. 10 is a view for describing reservoir areas of a first supply pipe and a reducing agent supply pipe.

FIG. 10 is a view for describing a reservoir area RA of the first supply pipe 435s and the reducing agent supply pipe 425s. In the present embodiment, each of regions from a top portion TP of the center of the tubes (first supply pipe 435s and reducing agent supply pipe 425s) to connection portions (CP1, CP2) between the pipes (first supply pipe 435s and reducing agent supply pipe 425s) and the injection valve 429 is defined as a reservoir area RA. The reservoir area RA is disposed between the reducing agent injection device 420 and the exhaust duct 149.

A vertical dimension (height dimension) H1 of the reservoir area RA of the first supply pipe 435s is set to about 150 mm to 200 mm. Similarly, a vertical dimension (height dimension) H2 of the reservoir area RA of the reducing agent supply pipe 425s is set to about 150 mm to 200 mm. Thereby, the cooling water and the urea water are reserved in the reservoir areas RA indicated by hatching. Providing the reservoir area RA of the first supply pipe 435s enables prevention of damage on the sealing member, the pipe, and the like due to the remaining heat of the engine 301 after stopping of the engine.

As shown in FIG. 5, in the present embodiment, the top portion TP of the first supply pipe 435s and the reducing agent supply pipe 425s is located inside the exhaust duct 149 and above the upper surface of the ceiling board 141. As shown in the figure, a longitudinal length L1 of the reservoir area RA is smaller than a longitudinal length L2 of the opening 144. The first supply pipe 435s and the reducing agent supply pipe 425s are routed such that the entire reservoir areas RA of the first supply pipe 435s and the reducing agent supply pipe 425s are held inside the opening 144 in plan view.

Each pipe is made of a hose having flexibility, a bracket and a metal fitting for routing each pipe are provided in each of the constituent members such as the engine hood 140, the rear-side frame 161, and the partition 160, and each pipe is supported in a predetermined position by using the bracket and the metal fitting for routing.

As described above, the air warmed inside the engine room 122E (cf. FIGS. 1 to 3) rises to be discharged to the outside of the engine room 122E via the exhaust duct 149. At this time, due to placement of the top portion TP and the reservoir areas RA of the first supply pipe 435s and the reducing agent supply pipe 425s on a route (on a flow passage) for a flow F (cf. schematic arrows shown in FIG. 5) generated by natural convection, it is possible to effectively cool the cooling water and the urea water that are reserved in the reservoir areas RA after stopping of the engine.

According to the embodiment described above, the following effects can be obtained:

(1) The wheel loader is provided with the exhaust gas purifying device 400 including: the selective catalytic reducing device 430 that performs treatment on exhaust gas of the engine 301; and the reducing agent injection device 420 that injects urea water into exhaust gas to be supplied to the selective catalytic reducing device 430. The wheel loader includes the housing 122 that delimits the engine room 122E accommodating the engine 301 and the exhaust gas purifying device 400. The housing 122 includes the engine hood 140 constituting the top board that covers the engine room 122E above the engine 301, and the exhaust duct 149 that is provided in the engine hood 140 and discharges the air in the engine room 122E to the outside of the engine room 122E. The reducing agent supply pipe 425s that guides the urea water is connected to the reducing agent injection device 420. A part (the top portion TP) of the reducing agent supply pipe 425s extending upward from the reducing agent injection device 420 is disposed in the exhaust duct 149 in the position above the reducing agent injection device 420.

In the present embodiment, the exhaust duct 149 includes the opening cover 142 that covers the upper side of the opening 144 in the ceiling board 141 of the engine hood 140 and is disposed opposing to the upper surface of the ceiling board 141 with a clearance therebetween, and the cover support frame 146 for supporting the opening cover 142. The top portion TP of the reducing agent supply pipe 425s is located above the upper surface of the ceiling board 141.

Hence it is possible to cool the reducing agent supply pipe 425s by the flow of the air that is warmed and rises in the engine room 122E and is discharged from the exhaust duct 149. It is thus possible to prevent an increase in temperature of the urea water inside the reducing agent supply pipe 425s, and thereby to prevent deterioration in quality of the urea water.

Although the exhaust gas purifying device 400 stops the supply of the urea water in accordance with the stopping of the engine 301, if the reducing agent remains in the reducing agent injection device 420 or the reducing agent supply pipe for supplying urea water, moisture evaporates due to the remaining heat therearound and urea is deposited, which might cause the occurrence of clogging in the reducing agent supply pipe 425s and the reducing agent injection device 420. In the present embodiment, it is possible to prevent an increase in temperature of the urea water in the reducing agent supply pipe 425s, and thereby to prevent clogging of the reducing agent injection device 420.

(2) The part of the first supply pipe 435s for guiding the cooling water of the engine 301 to the reducing agent injection device 420 is disposed in the exhaust duct 149 in the position above the reducing agent injection device 420. Similarly to the reducing agent supply pipe 425s, routing the supply pipe (first supply pipe 435s) for cooling water can prevent an increase in temperature of the cooling water reserved in the first supply pipe 435s after stopping of the engine 301, enabling effective cooling of the reducing agent injection device 420 by using the cooling water. This can lead to prevention of damage on the sealing member and the pipe (hose) in the connection portion of the reducing agent injection device 420.

(3) The exhaust duct 149 is located immediately above the reducing agent injection device 420. Between the reducing agent injection device 420 and the exhaust duct 149, the reservoir area RA is disposed which extends from the respective connection portions of the reducing agent injection device 420 with the reducing agent supply pipe 425s and the first supply pipe 435s to the top portion TP. Hence it is possible to effectively cool the entire reservoir area RA due to the flow of the air generated by natural convection.

Modifications as below are also within the scope of the present invention, and one or more of modifications can be combined with the embodiment described above.

(First Modification)

In the embodiment described above, the examples where the first supply pipe 435s is made up of the hose alone has been described, but the present invention is not limited thereto. As indicated by two-dot chain lines of FIG. 10, a reservoir portion 900 may be disposed in the hose so that the first supply pipe 435s may include the hose and the reservoir portion 900. The reservoir portion 900 has a larger cross sectional area of the flow passage than the cross sectional area of the flow passage of the hose, and is provided for the purpose of expanding the volume of the cooling water. Disposing the reservoir portion 900 in the exhaust duct 149 enables effective cooling of the cooling water in the reservoir portion 900.

(Second Modification)

In the embodiment described above, the cooling water circulation system is provided so as to prevent an increase in temperature of the urea water, but the cooling water circulation system may be used for thawing frozen urea water. When crane operation is performed in a cold region or in winter, if urea water is frozen, the reducing agent injection device 420 cannot supply the urea water. Hence the use of the reducing agent injection device 420 requires thawing of the frozen urea water and further requires prevention of the urea water from being frozen again. Accordingly, the cooling water warmed by heat exchange with the engine 301 is guided to the injection valve 429 and the urea water tank 127, to enable thawing of the frozen urea water and prevention of the urea water from being frozen again.

(Third Modification)

In the embodiment described above, the example where the urea aqueous solution is used as the reducing agent has been described, but the present invention is not limited thereto. The present invention is applicable to a work machine provided with the exhaust gas purifying device 400 using a variety of reducing agents such as an ammonia aqueous solution.

(Fourth Modification)

In the embodiment described above, the example where the present invention is applied to the wheel loader has been described, but the present invention is not limited thereto and applicable to a variety of work machines such as a hydraulic shovel or a crane.

Although the variety of embodiments and modifications have been described above, the present invention is not limited to the description of those. Other aspects conceivable within the scope of the technical idea of the present invention are also included in the scope of the present invention.

REFERENCE SIGNS LIST 122 housing
122E engine room
140 engine hood (top board)
141 ceiling board (top board)
142 opening cover
144 opening
146 cover support frame (support member)
149 exhaust duct
301 engine
400 exhaust gas purifying device
420 reducing agent injection device
425s reducing agent supply pipe
430 selective catalytic reducing device
435s first supply pipe (cooling water supply pipe)
900 reservoir portion

The invention claimed is:

1. A work machine comprising:
an exhaust gas purifying device which includes:
a selective catalytic reducing device that performs treatment on exhaust gas of an engine, and
a reducing agent injection device that injects a reducing agent into exhaust gas to be supplied to the selective catalytic reducing device; and
a housing that delimits an engine room accommodating the engine and the exhaust gas purifying device,
wherein:
the housing includes a top board that covers the engine room above the engine, and an exhaust duct that is provided in the top board and discharges air in the engine room to outside of the engine room,
the exhaust duct includes an opening cover that covers an upper side of an opening in the top board and is disposed opposing to an upper surface of the top board with a clearance therebetween, and a support member that supports the opening cover, and
a part of a reducing agent supply pipe for guiding the reducing agent to the reducing agent injection device is disposed in the exhaust duct in a position above the reducing agent injection device and above the upper surface of the top board.

2. The work machine according to claim 1, wherein a part of cooling water supply pipe that guides cooling water of the engine to the reducing agent injection device is disposed in the exhaust duct in a position above the reducing agent injection device.

3. The work machine according to claim 2, wherein
the exhaust duct is located immediately above the reducing agent injection device, and
an area is disposed between the reducing agent injection device and the exhaust duct, the area extending from respective connection portions of the reducing agent injection device with the reducing agent supply pipe and the cooling water supply pipe to a top portion.

4. The work machine according to claim 2, wherein
the cooling water supply pipe includes a hose and a reservoir portion disposed in the hose and having a larger cross sectional area of a flow passage than a cross sectional area of a flow passage of the hose, and
the reservoir portion is disposed in the exhaust duct.

* * * * *